Dec. 31, 1940.  F. V. KUZMITZ  2,227,392
OUTBOARD MOTOR
Filed Dec. 17, 1937  2 Sheets-Sheet 1
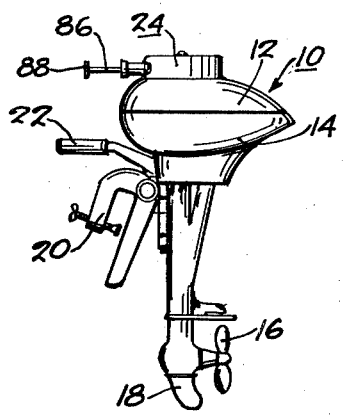
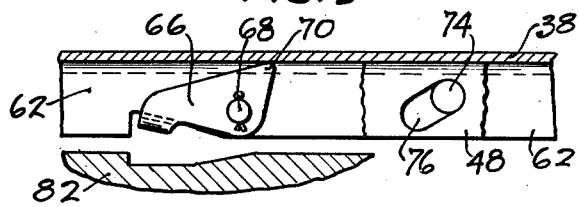
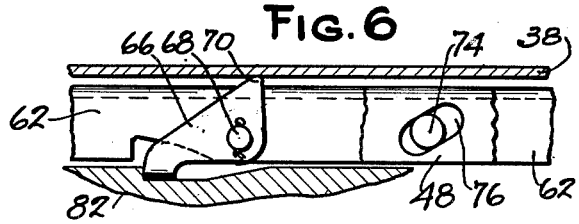
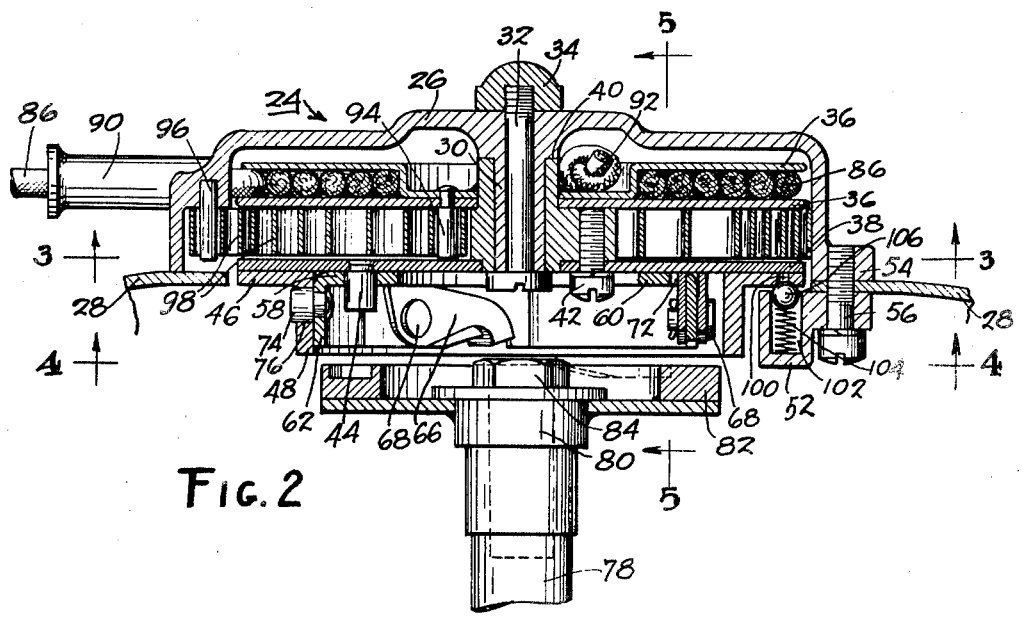
INVENTOR.
FRANK V. KUZMITZ
BY
G. E. Wilson
ATTORNEY.

Dec. 31, 1940.   F. V. KUZMITZ   2,227,392
OUTBOARD MOTOR
Filed Dec. 17, 1937   2 Sheets-Sheet 2

INVENTOR
FRANK V. KUZMITZ
BY
A. E. Wilson
ATTORNEY.

Patented Dec. 31, 1940

2,227,392

UNITED STATES PATENT OFFICE 2,227,392

OUTBOARD MOTOR

Frank V. Kuzmitz, South Bend, Ind., assignor, by mesne assignments, to Bendix Aviation Corporation, South Bend, Ind., a corporation of Delaware Application December 17, 1937, Serial No. 180,264

9 Claims. (Cl. 185—40)

This invention relates to starting devices, and more particularly to manually operated starting devices appropriate for use with outboard motors or the like.

In the outboard motor art, it has in the past, been common practice to start the engines of such devices by means of a starting rope or similar device, one end of which engages one of a plurality of spaced ears carried by the engine flywheel attached to the crankshaft of the engine to rotate the crankshaft to start the engine.

An object of this invention is to provide novel means associated with the flywheel of the engine to rewind the rope starting mechanism commonly used to start outboard motors.

Another object of this invention is to provide a compact device having at its bottom a plate with a plurality of dogs which, upon actuation, drop from their normal rest position and engage a serrated portion of a circular plate coaxially mounted on the crankshaft thus causing rotation of the crankshaft of the engine to start the engine.

A further object of the invention is to provide a compact mechanism utilizing a wound spring which wraps around itself tightly as the operator draws out the cranking rope and which spring unwinds rapidly as the operator releases the rope, thus winding the rope automatically back to its initial position in readiness for a second actuation should the first fail to cause the engine to start.

Another object of the invention is to provide a compact, economical, and simple device which will dispense with the necessity of manually rewinding the cranking rope before the operator can again spin the crankshaft of the engine.

A still further object of the invention is to provide a starting device which, upon being released by the operator, releases the dogs from the serrated portion of the plate of the crankshaft thus obviating any danger of injury to the operator should the engine be "cold."

The above and other objects and advantages of this invention will be apparent from the following detailed description of an illustrative embodiment thereof considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 1 is a side elevational view of an outboard motor embodying my novel starting device;

Figure 2 is a vertical section of my novel starting device;

Figures 5 and 6 are sections of the same mechanism taken on line 5—5 of Figure 2 showing the mechanism in two different operative positions.

Figure 3:
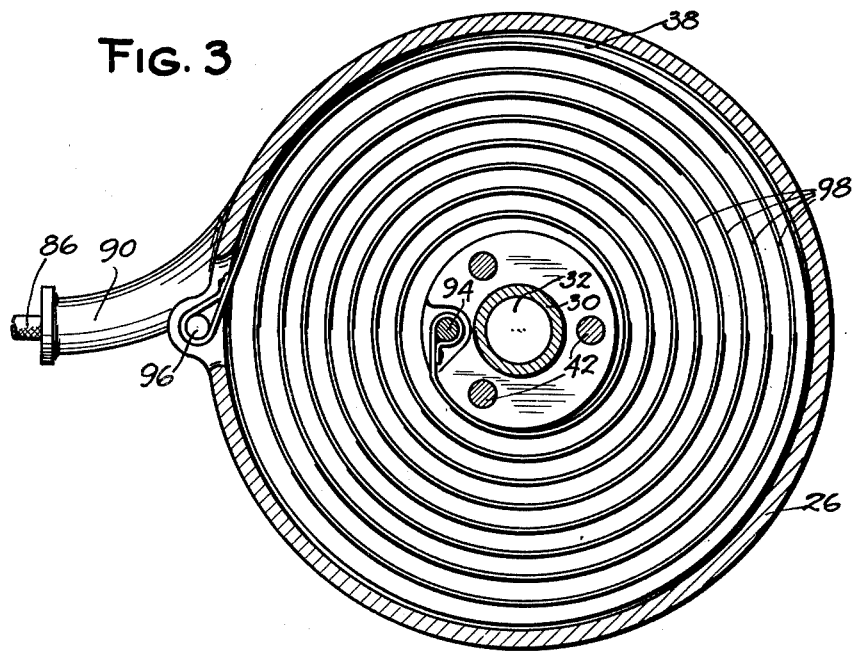
Figure 3 is a section taken on line 3—3 of Figure 2.
Figure 4:
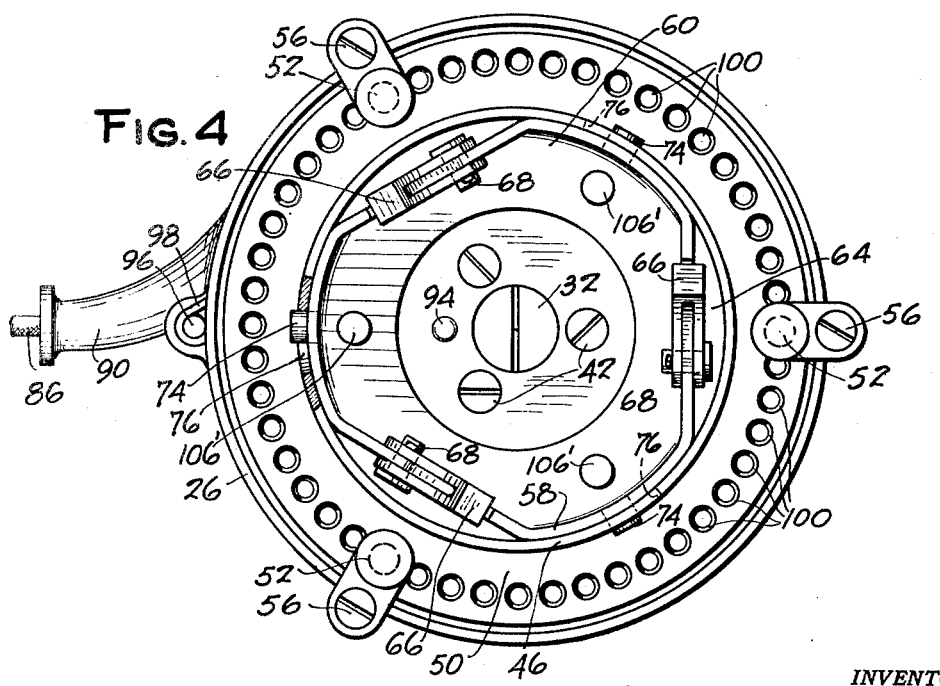
Figure 4 is a section taken on line 4—4 of Figure 2.

Referring now to the drawings, there is illustrated in Figure 1 a streamlined outboard motor 10 having a gas tank 12, a protective engine housing 14, a propeller 16, a protective propeller fin 18, a boat clamp 20, a steerage handle or tiller 22, and a manually operated starting mechanism 24.

Referring now more particularly to Figure 2, it will be observed that the starting mechanism 24 is illustrated in detail. In this illustration the starting mechanism is protected by a housing 26 and may, if desired, be attached directly to the outboard motor housing 28. The housing 26 has at its central axis an extended cylindrical portion 30 adapted to receive a supporting bolt 32. The supporting bolt 32 has an extended portion from the top of the housing 26 where it receives a dome head nut 34 which aids the supporting bolt 32 in holding the sheave plates 36 and 38 against an outer flanged portion 40 of the housing 26. The lower sheave plate 38 has at its bottom, bolts 42 which hold the two sheave plates 36 and 38 in close alignment. The sheave plate 38 also has extending therefrom guide pins 44. Attached also to the bottom of the sheave plate 38 is a removable circular plate 46 having an extended cylindrical portion 48.

The movable circle plate 46 is held in cooperation with the sheave plate 38 by means of detents 52 and ears 54 extending from the housing 26. The detents 52 are held in place by means of bolts 56 extending through the detents 52 and through the ears 54 of the housing 26. The movable circular plate 46 has mounted within its inner diameter another circular plate 58 having an extending cylindrical portion 62. This latter inner circular plate 58 has three segmental sections 64 cut away so as to receive and hold the dogs or ratchets 66 which are attached to the inner circular plate 58 by means such as rivets 68. In their normal rest position these dogs 66 lie within the inner plate 58 being unable to move therefrom because their shoulders 70 are held in contact with the bottom of the sheave plate 38, the shoulder 70 of the dogs 66 extending through cut-away portions 72 of the inwardly-extending flange 60 of the inner circular plate 58, and thus resting against the bottom of the sheave plate 38.

The inner circular plate 58 has riveted on its outer periphery of the extending cylindrical portion 62, extended means, for example, pins 74 which are adapted to be slidably mounted within the cam slots 76 cut in the extending cylindrical portion 48 of the outer circular plate 46. The starting mechanism 24 may, if desired, be constructed so as to lie within the housing of the outboard motor, and if so positioned will, as illustrated, be placed with its central axis directly in line with the central axis of the crankshaft 78 of the engine.

While, of course, the invention is not limited to any particular form, it will be understood, as illustrated in Figure 2, that the starting mechanism may be mounted directly above the crankshaft 78 of the engine if desired. If this mounting is utilized the upper end 80 of the crankshaft 78 has secured thereto a serrated member such, for example, as a circular plate 82 bolted to the crankshaft 78 by means of an extended bolt 84.

In operating the starting mechanism 24, the operator grasps the extended end of the cord 86, which has attached at its outer end a limiting means 88 whose diameter is greater than the inner diameter of the cord guide means 90. In pulling out the cord 86, the operator causes it to rotate the sheave plate 36, the cord 86 being wrapped around the inner portion of the sheave plate 36 and attached securely at the inner central portion of the sheave plate 36 as shown at 92. As the cord 86 is unwound the sheave plate 36 is rotated and being attached to the sheave plate 38 also causes the latter plate to rotate.

Within the sheave plate 38 a wound spring 98 is attached to a pin 94. At this point the spring 98 rests in an unwound position, having its other end attached to a pin 96. As the rope 86 is pulled out to induce rotation of the sheave plates, the spring 98 being attached at 94 and 96 winds about itself. The rotation of the sheave plates 36 and 38 causes the rotation of the removable circular plate 46.

On its outwardly-extended portion 50, the circular plate 46 has a series of holes 100 drilled through it. The central axis of these holes 100 lies directly above the central axis of the extended portion of the detent 52. This extended portion of each detent 52 has a socket 102 having therein a spring 104 and a small ball bearing 106 which rests against the spring 104 and lies in the holes 100 of the outwardly-extended flange 50 of the outer circular plate 46. As the cord 86 is drawn out, the sheave plates 36 and 38 also rotate and the bottom of the sheave plate 38 carries along with it the guide pins 44. These pins 44 fit directly into the holes 106' in the inner circular plate 58.

As the bottom of the sheave plate 38 rotates, the extended bolts 44 carry with them the inner circular plate 58. The rotation of this inner circular plate 58 causes it to carry the outer circular plate 46 to which it is frictionally attached. The detents 52 with their ball bearings 106 engaging the material forming the holes 100 induce the rotation of the outer circular plate 46 to slow down while the bolts 44, attached directly to the bottom of the sheave plate 38, cause the rotation of the inner circular plate 58 to speed up. This action causes the extended means 74 to move from their normal position in the cam slots 76 as shown in Figure 5, to their active position as shown in Figure 6. This motion causes the shoulders 70 of the dogs 66, resting against the bottom of the sheave plate 38 as shown in Figure 5, to drop because the inner circular plate 58 has moved to the position shown in Figure 6, causing the dogs 66 to drop to their active position illustrated on Figure 6, thereby engaging the serrated surface of the circular plate 82 and thus turning the crankshaft 78 of the engine to start the engine through plate 82.

As the engine fires, the operator releases the cord 86 and as the action hereinbefore described has caused the spring 98 to wrap around itself, it is at a tension tending to unwrap itself. As the cord 86 is released the spring 98 unwinds rapidly causing rapid rotation of the sheave plates 36 and 38 which causes the cord 86 to be wound about itself in its sheave plate 36 while the spring unwinds in its sheave plate 38.

The releasing of the cord 86 causes the inner circular plate 58 to be carried rapidly by the extended bolts 44 to its rest position. The detents 52 again tend to impede the rotation of the outer circular plate 46, such action causing the means 74 to fall back to its rest position in the cam slots 76 as shown in Figure 5. This causes the dogs to fall back into their rest position of Figure 5 disengaging the serrated surface of the circular plate 82. As this takes place the dogs are back in position, the spring is unwound, the cord is wound around its sheave plate and the mechanism is in a position and state to be again operated should the first rotation of the crankshaft fail to start the engine.

While this invention has been illustrated and described with particular reference to a single illustrative embodiment, it is to be understood that the scope of the invention is not to be limited by the particular features illustrated and described, as many changes can be made without departing from the spirit of the invention as defined by the following claims.

I claim:

1. In an outboard motor including an engine having a generally vertically disposed crankshaft adapted to be rotated to start the engine, means to rotate the crankshaft comprising a rotatable sheave, yielding means urging the sheave to rotate in one direction, guide means carried by the sheave, flexible means carried by the sheave to rotate the sheave and tension the yielding means as the flexible means is pulled with reference to said guide means, a serrated plate carried by the crankshaft, ratchet means rotatable with the sheave and adapted to engage said plate to rotate the crankshaft when the sheave is rotated to tension the yielding means, and means associated with the ratchet means to hold the ratchet means out of engagement with the plate except when the sheave is angularly shifted in the direction to tension the yielding means.

2. In an outboard motor a crankshaft including a member fixed thereto having a plurality of recesses formed therein, a starting rope engaging sheave, and a one-way clutch comprising spaced dog members rotatable with the sheave, and adapted to engage in said recesses, a rotatable sleeve adapted to carry said dogs, upstanding ears carried by the dogs, and a member adapted to engage said ears to move the dogs to an inoperative position except when the sheave is rotated in the engine starting direction.

3. In apparatus of the class described, an engine having a crankshaft, a rotatable sheave, yielding means for urging the sheave to rotate in one direction, flexible means associated with the sheave to rotate the latter when said flexible means are tensioned, ratchet means operatively connected to said sheave and adapted for engaging the crankshaft, said ratchet means normally being disengaged from said crankshaft, and means responsive to movement of said sheave to move the ratchet means into engagement with the crankshaft.

4. In apparatus of the class described, an engine having a crankshaft, a rotatable sheave, yielding means for urging the sheave to rotate in one direction, flexible means associated with the sheave to rotate the latter when said flexible means are tensioned, ratchet means operatively connected to said sheave and adapted for engaging the crankshaft, and means immediately responsive to movement of said sheave when said yielding means is tensioned to move the ratchet means into engagement with the crankshaft.

5. In apparatus of the class described, an engine having a crankshaft, a rotatable sheave, yielding means for urging the sheave to rotate in one direction, flexible means associated with the sheave to rotate the latter when said flexible means are tensioned, concentric sleeve members mounted concentric with said sheave, means for adapting one of said sleeves for rotation with said sheave and for axial movement relative thereto and to another of said sleeve members, and dog members for engaging said crank shaft, said dog members being pivotally mounted upon one of said sleeves and being movable from an operative to an inoperative position by said relative axial movement.

6. In an outboard motor, an engine having a crankshaft, a rotatable sheave, resilient means for urging the sheave to rotate in one direction, a clutch for engaging said crankshaft comprising a rotatable sleeve operatively connected to said sheave, a plurality of dogs pivotally mounted upon the sleeve, said dogs being adapted for engaging said crankshaft and being movable from an inoperative to an operative position in response to an axial movement of the sleeve from a first predetermined position to a second predetermined position relative to the sheave, and means for maintaining the sleeve in said first position, the last named means being effective, except when the sheave is rotated against the pressure of said resilient means.

7. In apparatus of the class described, a rotatable sheave, yielding means for urging the sheave to rotate in one direction, flexible means associated with the sheave to rotate the latter when the flexible means are tensioned, a ratchet supporting member adapted for angular movement with said sheave and for axial movement relative thereto, one or more ratchets upon said member, the position of said ratchets being a function of the axial position of said supporting member relative to said sheave, another member operatively associated with said sheave and adapted for angular movement therewith, means for frictionally engaging the last-named member tending to retard an angular velocity thereof, means operatively interconnecting the last-named member and the ratchet supporting member for controlling the axial position of the supporting member in response to the velocity of said last-named member relative to said sheave, an element engageable by said ratchets, and a crankshaft attached to said element.

8. In apparatus of the class described, a rotatable sheave, yielding means for urging the sheave to rotate in one direction, flexible means associated with the sheave to rotate the sheave when the flexible means are tensioned, a crankshaft, ratchet means operatively connected to said sheave and adapted for engaging said crankshaft, a rotatable member frictionally engaging said sheave, means for frictionally engaging said rotatable member tending to retard an angular velocity thereof, and means for controlling the movement of said ratchet means into and out of engagement with said crankshaft in response to the angular velocity differential between said rotatable member and said sheave.

9. In apparatus of the class described, a rotatable sheave, yielding means for urging the sheave to rotate in one direction, flexible means associated with the sheave to rotate the latter when the flexible means are tensioned, a rotatable member frictionally engaging said sheave, means engaging the rotatable member tending to retard any angular movement of said member, one or more ratchets operatively connected to the sheave and adapted for rotation therewith, a crankshaft engageable by said ratchets, and means for controlling the movement of the ratchets into engagement with the crankshaft in response to a predetermined movement of the sheave relative to the rotatable member, said means also controlling the movement of the ratchets out of engagement with the crankshaft in response to another predetermined movement of the sheave relative to the rotatable member.

FRANK V. KUZMITZ.